(12) United States Patent
Mangano (10) Patent No.: US 9,632,793 B2
(45) Date of Patent: Apr. 25, 2017

(54) METHOD AND DEVICE FOR ABORTING TRANSACTIONS, RELATED SYSTEM AND COMPUTER PROGRAM PRODUCT

(71) Applicant: STMicroelectronics S.r.l., Agrate Brianza (IT)

(72) Inventor: Daniele Mangano, San Gregorio di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 522 days.

(21) Appl. No.: 13/888,062

(22) Filed: May 6, 2013

(65) Prior Publication Data

US 2013/0297913 A1 Nov. 7, 2013

(30) Foreign Application Priority Data

May 7, 2012 (IT) .............................. TO2012A0406

(51) Int. Cl.
| | | |
|---|---|---|
| *G06F 9/38* | (2006.01) | |
| *G06F 9/46* | (2006.01) | |
| *G06F 11/07* | (2006.01) | |
| *G06F 13/16* | (2006.01) | |
| *G06F 9/48* | (2006.01) | |

(52) U.S. Cl.
CPC .......... *G06F 9/3867* (2013.01); *G06F 9/3861* (2013.01); *G06F 9/466* (2013.01); *G06F 9/485* (2013.01); *G06F 11/0766* (2013.01); *G06F 11/0793* (2013.01); *G06F 13/1605* (2013.01)

(58) Field of Classification Search
None
See application file for complete search history.

(56) References Cited

U.S. PATENT DOCUMENTS

| | | | |
|---|---|---|---|
| 4,920,483 A * | 4/1990 | Pogue et al. .................. | 711/219 |
| 5,016,162 A * | 5/1991 | Epstein et al. ................ | 710/242 |
| 5,287,537 A * | 2/1994 | Newmark et al. ............. | 712/29 |
| 5,551,023 A * | 8/1996 | Alonso ......................... | 707/703 |
| 6,055,579 A * | 4/2000 | Goyal et al. .................. | 713/375 |
| 6,715,038 B1 * | 3/2004 | Nguyen et al. ............... | 711/125 |
| 7,516,366 B2 * | 4/2009 | Lev ........................ | G06F 9/466 |
| | | | 711/153 |
| 7,568,089 B1 * | 7/2009 | Favor et al. .................. | 712/228 |
| 7,870,369 B1 | 1/2011 | Nelson et al. | |
| 8,838,534 B2 * | 9/2014 | Fowler .................... | G06F 9/466 |
| | | | 707/615 |
| 2002/0062459 A1 * | 5/2002 | Lasserre et al. ............... | 714/10 |
| 2008/0209103 A1 * | 8/2008 | Haga ............................ | 711/100 |

(Continued)

OTHER PUBLICATIONS

IBM Technical Disclosure Bulletin NA8909474, Sep. 1989.*

(Continued)

*Primary Examiner* — Steven Snyder
(74) *Attorney, Agent, or Firm* — Seed IP Law Group LLP (57) ABSTRACT

Current tasks being executed in a set of modules of a signal processing system managed via an interface block are aborted so as to permit the execution of new tasks by pipelining eliminating transactions of said current tasks and executing transactions of the new tasks. Upon arrival of a signal to abort the current tasks, data and/or memory accesses present in said interface block are discarded.

36 Claims, 4 Drawing Sheets

(56) References Cited

U.S. PATENT DOCUMENTS

2009/0031310 A1* 1/2009 Lev .................... G06F 11/1405
718/101
2011/0041006 A1* 2/2011 Fowler .................. G06F 9/466
714/10

OTHER PUBLICATIONS

'Dynamic Restructuring of Transactions' by Kaiser and Pu, Aug. 21, 1991.*
'An Abort-Aware Model of Transactional Programming' by Kousha Etessami and Patrice Godefroid, from Proceedings of the 10th International Conference on Verification, Model Checking, and Abstract Interpretation pp. 59-73, Dec. 18-20, 2008.*
Italian Search Report, dated Dec. 4, 2012 for Italian Application No. TO20120406, 6 pages.
Texas Instruments, "OMAP5912 Multimedia Processor Peripheral Interconnects Reference Guide," Mar. 31, 2004, Retrieved from the Internet: URL: http://www.ti.com/lit/ug/spru758a/spru758a.pdf, 52 pages.

* cited by examiner

METHOD AND DEVICE FOR ABORTING TRANSACTIONS, RELATED SYSTEM AND COMPUTER PROGRAM PRODUCT

BACKGROUND

Technical Field

The present disclosure relates to techniques for discontinuing (e.g., according to the currently used term, "aborting") transactions, such as transaction in signal processing systems.

Description of the Related Art

Complex signal processing systems may comprise nowadays various hardware and software components, each of them having a respective function (for example video signal display, graphic functions, video decoding, etc.): they may be for example logic and/or data blocks, currently named IP (for Intellectual Property) cores.

In various solutions, the hardware and software components of the system may be interfaced with the system interconnections through a specific interface block having the function of generating bus transactions.

In various solutions, the interface block may receive as inputs the requests of various components (for example requests for direct memory access, DMA), and/or of data (for example in case of write accesses) and may generate corresponding bus transactions with the required features (address, format and so on).

BRIEF SUMMARY

This disclosure concerns a related device, a related system and a related computer program product, which may be loaded into the memory of at least one computer and comprises software code parts adapted to execute the method steps when the product is run on at least one computer. The reference to such a computer program product refers to, for example a computer readable medium, containing instructions for controlling the processing system, in order to coordinate the implementation of the method according to an embodiment. The reference to "at least one computer" obviously highlights the possibility of implementing at least one embodiment in a modular and/or distributed form.

Various embodiments may be based on the solution of pipelining the processing of both "old" tasks which are being aborted and of "new" tasks the execution whereof is being started.

In at least one embodiment, it is possible to achieve an efficient solution which enables a pipelining processing:
on one hand, by aborting transactions concerning one or several "old" tasks, e.g., with low priority, and
on the other hand, by executing one or several "new" tasks, for example in real time.

At least one embodiment may be applied to IP modules or cores of various kinds (for example CPUs or specifically dedicated hardware/software components), for example associated with various bus protocols (STBus, AMBA, AXI, etc.).

According to at least one embodiment, those data and memory access (DMA) transactions which upon arrival of the Abort command are located within the interface block may be discarded immediately.

According to at least one embodiment, those transactions which are pending upon arrival of the Abort command may be marked as aborted.

At least one embodiment may discard the transactions marked as aborted via a dedicated filtering unit, when they come back to the interface block while this is already processing new tasks.

In an embodiment, a method of aborting current tasks being executed in a set of modules of a signal processing system managed via an interface block in order to permit executing new tasks in said set of modules, includes aborting said current tasks by pipelining eliminating transactions of said current tasks and executing transactions of said new tasks. In an embodiment, the method includes, upon arrival of a signal to abort said current tasks, discarding data and/or memory accesses present in said interface block. In an embodiment, the method includes, as a result of the arrival of a signal to abort said current tasks: marking pending transactions of current tasks as aborted, and eliminating transactions marked as aborted as they return to said interface block during the execution of transactions of said new tasks. In an embodiment, the method includes: assigning respective identifiers to said transactions, upon arrival of a signal to abort said current tasks, marking as aborted the identifiers assigned to the pending transactions of said current tasks, and eliminating transactions whose identifiers are marked as aborted by filtering them out of transaction coming back to said interface block during the execution of such transactions of said new tasks. In an embodiment, said transactions are assigned respective transaction identifiers, the method including assigning to transactions of said new tasks transaction identifiers previously assigned to transactions of said current tasks that have been eliminated.

In an embodiment, a device for aborting current tasks being executed in a set of modules of a signal processing system managed via an interface block in order to permit executing new tasks in said set of modules, the device including at least one module coupled to said interface block and configured for aborting said current tasks by pipelining eliminating transactions of said current tasks and executing transactions of said new tasks. In an embodiment, the device is sensitive to a signal to abort said current tasks and configured to discard data and/or memory accesses present in said interface block upon arrival of said signal to abort said current tasks. In an embodiment, the device includes: a control module sensitive to a signal to abort said current tasks, a memory module to mark as aborted pending transactions of said current tasks upon arrival of said signal to abort said current tasks, and a filtering module to eliminate transactions marked as aborted as they come back to the interface block during execution of said transactions of said new tasks. In an embodiment, said memory module is configured to store the state of the respective transaction identifiers assigned to said transactions of said current tasks, said control module is configured to assign, upon arrival of a signal to abort said current tasks, an aborted state to identifiers assigned to pending transactions of said current tasks, and said filter module is configured to eliminate the transactions whose identifiers are assigned an aborted state by filtering them out of the transactions coming back to said interface block during the execution of said transactions of said new tasks. In an embodiment, said transactions are assigned respective identifiers of transaction, the device configured to assign to transactions of said new tasks transaction identifier previously assigned to transactions of said current tasks that have been eliminated.

In an embodiment, a signal processing system includes a set of modules managed via an interface block, the system including a device according one or more of the embodiments disclosed herein.

In an embodiment, a computer program product, loadable in the memory of at least one computer, includes software code portions, to implement one or more of the embodiments disclosed herein. In an embodiment, a method comprises: receiving, by one or more processing devices, an indication to abort one or more current tasks being executed by a signal processing system having an interface block and one or more processing cores; responding, by the one or more processing devices, to the received indication by: pipelining elimination of one or more transactions associated with said one or more current tasks; and executing one or more transactions associated with one or more new tasks. In an embodiment, the responding includes discarding at least one data or memory access in said interface block. In an embodiment, the pipelining elimination of one or more transactions includes: marking one or more pending transactions of the one or more transactions associated with the one or more current tasks as aborted; and eliminating a pending transaction marked as aborted in response to a return of transaction results associated with the pending transaction to said interface block during execution of one or more transactions associated with said one or more new tasks. In an embodiment, the method comprises: assigning respective identifiers to said one or more pending transactions; responding to the indication to abort by marking as aborted the identifiers assigned to the one or more pending transactions associated with said current tasks; and eliminating transactions whose identifiers are marked as aborted by filtering the transactions out of transaction results returned to said interface block during the execution of the one or more transactions associated with said one or more new tasks. In an embodiment, transactions are assigned respective transaction identifiers, the method including assigning to one or more transactions associated said new tasks transaction identifiers previously assigned to eliminated transactions associated with said one or more current tasks.

In an embodiment, a device comprises: an input configured to receive an indication to abort one or more current tasks of a signal processing system having an interface block and one or more processing cores; and one or more processing devices configured to respond to the indication by: pipelining elimination of one or more transactions associated with said one or more current tasks; and executing one or more transactions associated with one or more new tasks. In an embodiment, the one or more processing devices are configured to discard data and memory accesses associated with the one or more current tasks in response to the indication. In an embodiment, the one or more processing devices comprise: a memory configured to store information related to the one or more pending transactions associated with the one or more current tasks; a filtering module configured to filter responses to transactions; and a control module configured to control the memory to mark as aborted the one or more pending transactions associated with the one or more current tasks and to control the filter to discard responses to transactions marked as aborted. In an embodiment, said memory is configured to store a state of respective transaction identifiers assigned to transactions associated with current tasks, said control module is configured to assign, in response to the indication to abort said one or more current tasks, an aborted state to identifiers assigned to pending transactions associated with said one or more current tasks, and said filter module is configured to filter responses to transactions whose identifiers are assigned an aborted state out of responses returned to said interface block during execution of said one or more transactions of said one or more new tasks. In an embodiment, transactions are assigned respective identifiers, and the control module is configured to assign to transactions of said one or more new tasks transaction identifiers previously assigned to eliminated transactions associated with said one or more current tasks.

In an embodiment, a system comprises: an interface configured to couple a processing system having one or more processing cores to a bus system; and a controller configured to respond to an indication to abort one or more current tasks by: pipelining elimination of one or more transactions associated with said one or more current tasks; and executing one or more transactions associated with one or more new tasks. In an embodiment, the controller comprises: a memory configured to store information identifying transactions to be eliminated; and a filter configured to discard results associated with a transaction when the stored information indicates the transaction is to be eliminated. In an embodiment, at least one of the memory and the filter are integrated into the interface.

In an embodiment, a non-transitory computer-readable medium contains contents which configure one or more processing devices to perform a method, the method comprising: responding to an indication to abort one or more current tasks being executed by a signal processing system having an interface block and one or more processing cores by pipelining elimination of one or more transactions associated with said one or more current tasks; and concurrently executing one or more transactions associated with one or more new tasks. In an embodiment, the responding includes discarding at least one data or memory access in said interface block. In an embodiment, the pipelining elimination of one or more transactions includes: marking one or more pending transactions of the one or more transactions associated with the one or more current tasks as aborted; and eliminating a pending transaction marked as aborted in response to a return of transaction results associated with the pending transaction to said interface block during execution of one or more transactions associated with said one or more new tasks. In an embodiment, the method includes: assigning respective identifiers to said one or more pending transactions; responding to the indication to abort by marking as aborted the identifiers assigned to the one or more pending transactions associated with said current tasks; and eliminating transactions whose identifiers are marked as aborted by filtering the transactions out of transaction results returned to said interface block during the execution of the one or more transactions associated with said one or more new tasks. In an embodiment, transactions are assigned respective transaction identifiers, the method including assigning to one or more transactions associated said new tasks transaction identifiers previously assigned to eliminated transactions associated with said one or more current tasks.

In an embodiment, a device comprises: an input configured to receive an indication to abort one or more current tasks of a signal processing system having an interface and one or more processing cores; and one or more processing devices configured to respond to the indication by: identifying one or more pending transactions associated with said one or more current tasks to be aborted; initiating executing of one or more transactions associated with one or more new tasks; and filtering received transaction results based on the identified one or more pending transactions associated with said one or more current tasks. In an embodiment, the one or more processing devices are configured to discard data in the interface that is associated with the one or more current tasks in response to the indication. In an embodiment, the one or more processing devices comprise: a memory configured to store information identifying the one or more pending transactions associated with the one or more current tasks; a filter configured to filter responses to transactions; and a controller configured to control the memory to mark as aborted the one or more pending transactions associated with the one or more current tasks and to control the filter to discard responses to transactions marked as aborted. In an embodiment, said memory is configured to store a state of respective transaction identifiers assigned to transactions associated with current tasks, said controller is configured to assign, in response to the indication to abort said one or more current tasks, an aborted state to identifiers assigned to pending transactions associated with said one or more current tasks, and said filter is configured to filter responses to transactions whose identifiers are assigned an aborted state out of responses returned to said interface during execution of said one or more transactions associated with said one or more new tasks. In an embodiment, transactions are assigned respective identifiers, and the control module is configured to assign to transactions of said one or more new tasks transaction identifiers previously assigned to eliminated transactions associated with said one or more current tasks.

In an embodiment, a system comprises: means for eliminating pending transactions associated with aborted tasks of a signal processing device; and means for concurrently initiating execution of transactions associated with one or more new tasks of the signal processing system. In an embodiment, the means for eliminating is configured to filter out responses to eliminated transactions during execution of transactions associated with the one or more new tasks of the signal processing system. In an embodiment, the system further comprises the signal processing device. In an embodiment, the means for eliminating and the means for initiating are integrated into an interface of the signal processing device.

BRIEF DESCRIPTION OF THE SEVERAL VIEWS OF THE DRAWINGS

Example embodiments will now be described, by way of non-limiting example only, with reference to the enclosed views, wherein.

DETAILED DESCRIPTION

In the following description, numerous specific details are given to provide a thorough understanding of embodiments. The embodiments may be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
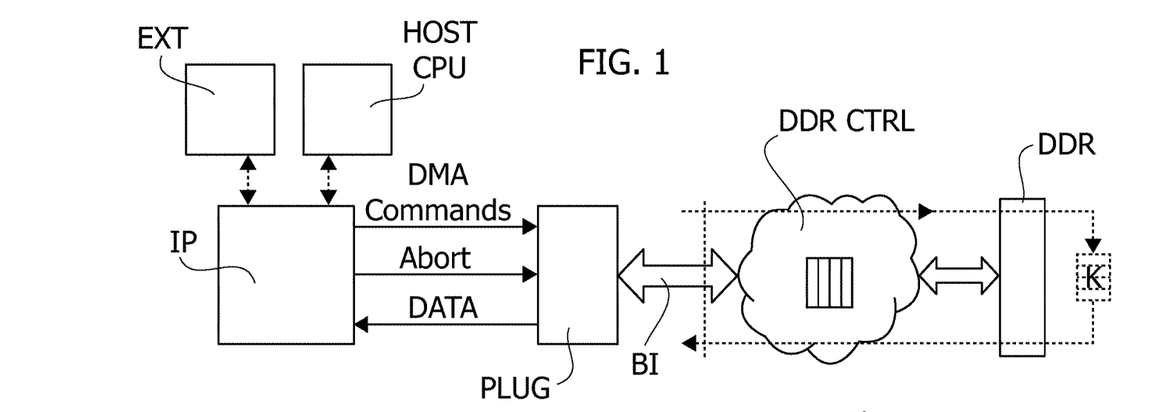
FIG. 1 is a block diagram of a computing system.

The block diagram in FIG. 1 shows, by way of example only, a computing system. In the example of FIG. 1 an IP module is provided (a complex system normally has a plurality of such modules) which, on one hand, is interfaced with one or several external modules EXT and with a CPU acting as a host and, on the other hand, cooperates with a bus interface (BI) through an interface block PLUG. For example, IP module may send to block PLUG DMA commands for accessing a memory (for example a double data rate, DDR, memory) and may receive from block PLUG the data, denoted with DATA, coming from the memory.

The diagram in FIG. 1 also shows that module IP may send to interface block PLUG a command, named Abort, adapted to abort one or more transactions being currently executed, in general in a number k, wherein k may have any value. According to various solutions, they may be transactions concerning interconnect functions, and/or concerning control functions (reading/writing) of a memory (DDR CTRL).

In various solutions (and in various presently considered embodiments), the functions performed by interface block PLUG may actually be integrated into an IP module: the distinction used herein is therefore to be interpreted as merely exemplary.

FIG. 2 shows, once again by way of diagrammatic example, that interface block PLUG may operate bidirectionally, e.g., by emitting signals concerning transactions of various kinds: Req (request), TID (transaction identifier), DATA/Other (data/other kinds of information), EOT (end of transaction), and by receiving corresponding responses RReq, RTID, RData/Other, REOT, which "come back" towards block PLUG.

Figure 2:
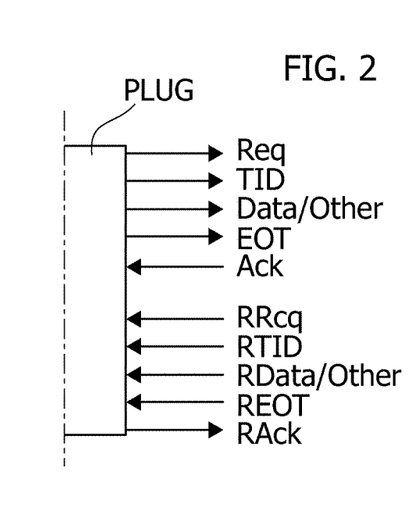
FIG. 2 is a functional block diagram of an interface.

Said bidirectional operation may moreover involve the reception of an acknowledgement signal Ack, to which interface block PLUG reacts with a corresponding response signal RAck.

While switching, for example because of an unpredicted event, from a normal task NT being executed to another task, such as a real time task RTT, it may be desirable to be able to abort as rapidly as possible the current task or tasks, so as to be enabled to start the execution of one or several new tasks.

Modern signal processing systems may have a high buffering capacity (for example at the level of the integrated computer network (ICN) and/or memory control): the number of current transactions to be aborted upon arrival of an Abort command may therefore be very high.

The inventors have observed that a task of an IP core may actually involve several memory accesses (for example DMA accesses), which further increases the number of transactions on a bus such as bus BI in FIG. 2; moreover, even though theoretically the transactions associated with one single task may be executed one at a time (which would imply having one single outstanding transaction), in modern systems this possibility may be unlikely due to the need of IPs to obtain a high throughput. Mainly for this reason, modern protocols and on-chip communication systems (such as AMBA AXI or STBus) may support multiple (outstanding) transactions, e.g., may have several outstanding transactions at the same time. In various solutions, the number of outstanding transactions may depend on various factors, such as for instance the buffering capacity of the system (Interconnect+Memory Controller), the specific nature of the IP, etc.

The problem therefore arises of aborting a high number of transactions rapidly and with low cost: by "rapidly" it is meant that, upon reception of an Abort command (which is output for example through a dedicated signal), the IP core or cores are enabled to abort as soon as practical the execution of the current tasks, so as to ensure the execution of the new task(s), for example in substantially real time.

The inventors have observed that after the Abort signal, the interface block may stall, while waiting for the "come-back" of all current transactions, while the operation of the interface block restarts when no more transactions are being executed.

The inventors have observed that, particularly in the presence of a high number of pending transactions, this solution may impact the system performance.

In some specific processors (see for example processor TI OMAP Multimedia), in order to handle access errors an abort function is implemented, however without achieving a solution which may manage several pending transactions.

FIGS. 3 to 9 refer by way of example to a processing system arrangement as previously exemplified with reference to FIGS. 1 to 2. The description already provided with reference to such Figures, therefore, applies to the following exemplary embodiments as well, if not otherwise specified or apparent in view of the context. As previously noted, it is possible to integrate into an IP module the functions of interface block PLUG.

Figure 3:
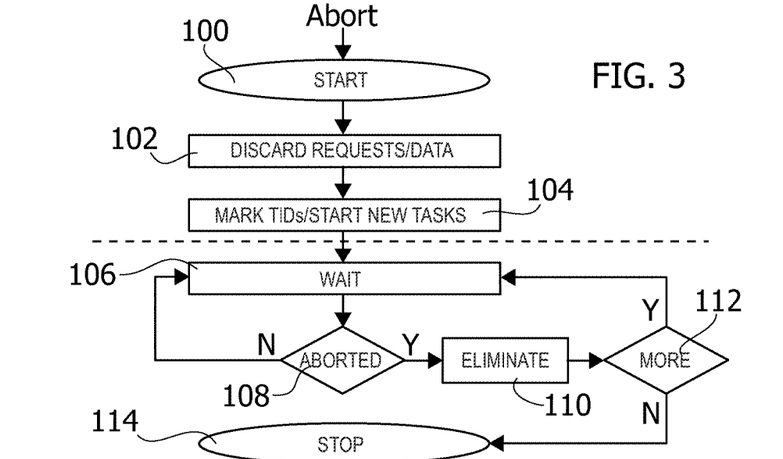
FIG. 3 is a flow chart representative of an embodiment of a method.
Figure 4:
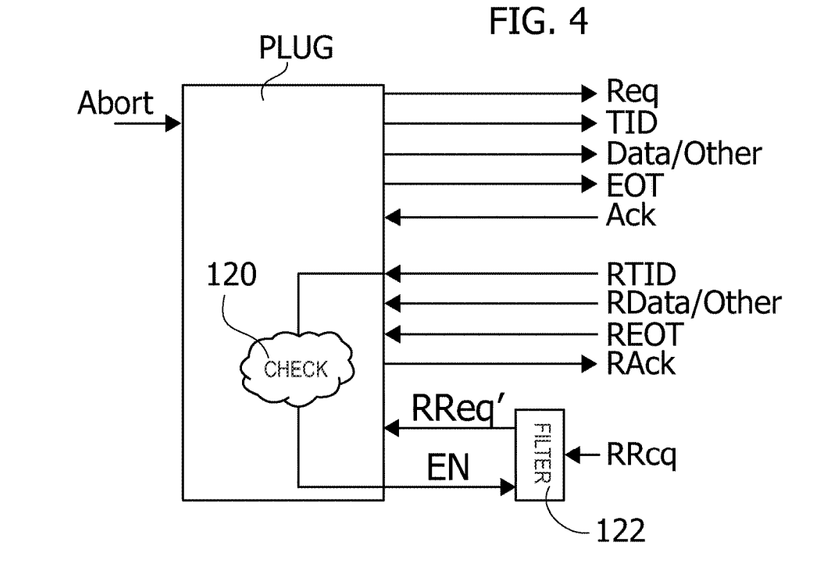
FIG. 4 is a functional block diagram of an embodiment of an interface.

FIGS. 3 and 4 show a first representation of possible embodiments, relating to operating modes which may be performed when a signal (Abort) is received which commands for example interface module PLUG, shown in FIG. 1, to abort one or several tasks being executed, so as to start one or several new tasks, for example having priority over the former ones, for example because they are tasks to be performed in real time (real time tasks, RTT).

In various embodiments, upon reception of the Abort signal, interface block PLUG may therefore start, in a step 100, the corresponding procedure and may discard, in the following step 102, the pending access (DMA) requests and/or data which are currently within interface block PLUG itself.

In various embodiments, in a subsequent step 104, interface block PLUG may mark the transaction identifiers (TID) related to the transactions being executed as aborted, and may start (according to a general pipelined arrangement) the execution of the new task(s). In various embodiments, when interface block PLUG restarts the normal operation and starts processing the new task(s), as related "new" transaction identifiers it is possible to use (also) identifiers which were previously associated to "aborted" transactions, which were discarded at their return.

In various embodiments, the steps denoted by 100, 102 and 104 may therefore be considered as representative of an internal function of interface block PLUG.

The following steps of the flow chart in FIG. 3 revolve around a step 106, adapted to be considered as a waiting step for the return of a transaction being executed.

In various embodiments, starting from step 106, in a step 108 interface block PLUG may check whether the identifiers of return transactions are among those which were marked as "aborted" at step 104 (and therefore correspond to transactions related to "old" tasks to be aborted).

If step 108 yields a negative result (N, which means it is a transaction related to a "new" task, not to be aborted, the identifier whereof is not marked as "aborted") the process simply returns to step 106.

If on the contrary step 108 yields a positive result (Y, which means it is a transaction related to an "old" task to be aborted, the identifier whereof was marked as "aborted"), in various embodiments interface block PLUG may, in a subsequent step 110, see to eliminating the related transaction. In various embodiments, interface block PLUG may make the corresponding identifier available again, in order to assign it to a (new) transaction.

Reference 112 denotes a step that checks whether identifiers are still present which are marked as "aborted" (e.g., that checks whether transactions still exist the return of which is awaited).

If step 112 yields a positive result (Y), the process returns to step 106. If step 112 yields a negative result (N), the procedure is completed in a step 114.

In various embodiments, steps 106 to 114 may be considered as representative of the dedicated filtering function which has been discussed previously.

In a direct comparison with FIG. 2, FIG. 4 shows that the operation criteria illustrated by way of example with reference to the flow chart in FIG. 3 may be considered as the expression of the possibility of providing, coupled or associated with interface block PLUG:
    a module 120, configured to check (aborted/non aborted) identifiers, for example starting from the related response signal RTID, by generating a corresponding signal EN, and
    a module 122, configured to filtering responses depending on the value of signal EN, by discarding, for example at the level of response signal RReq, transactions related to "old" tasks which are aborted; in various embodiments, this may be accomplished by sending back, towards interface block PLUG, only those answers RReq' which correspond to the "new" tasks.

By speaking of the modules 120, 122 being "coupled or associated" to interface block PLUG, such modules may or may not be internal to block PLUG: for example, in FIG. 4 module 120 is shown as internal, and module 122 as external.

Figure 5:
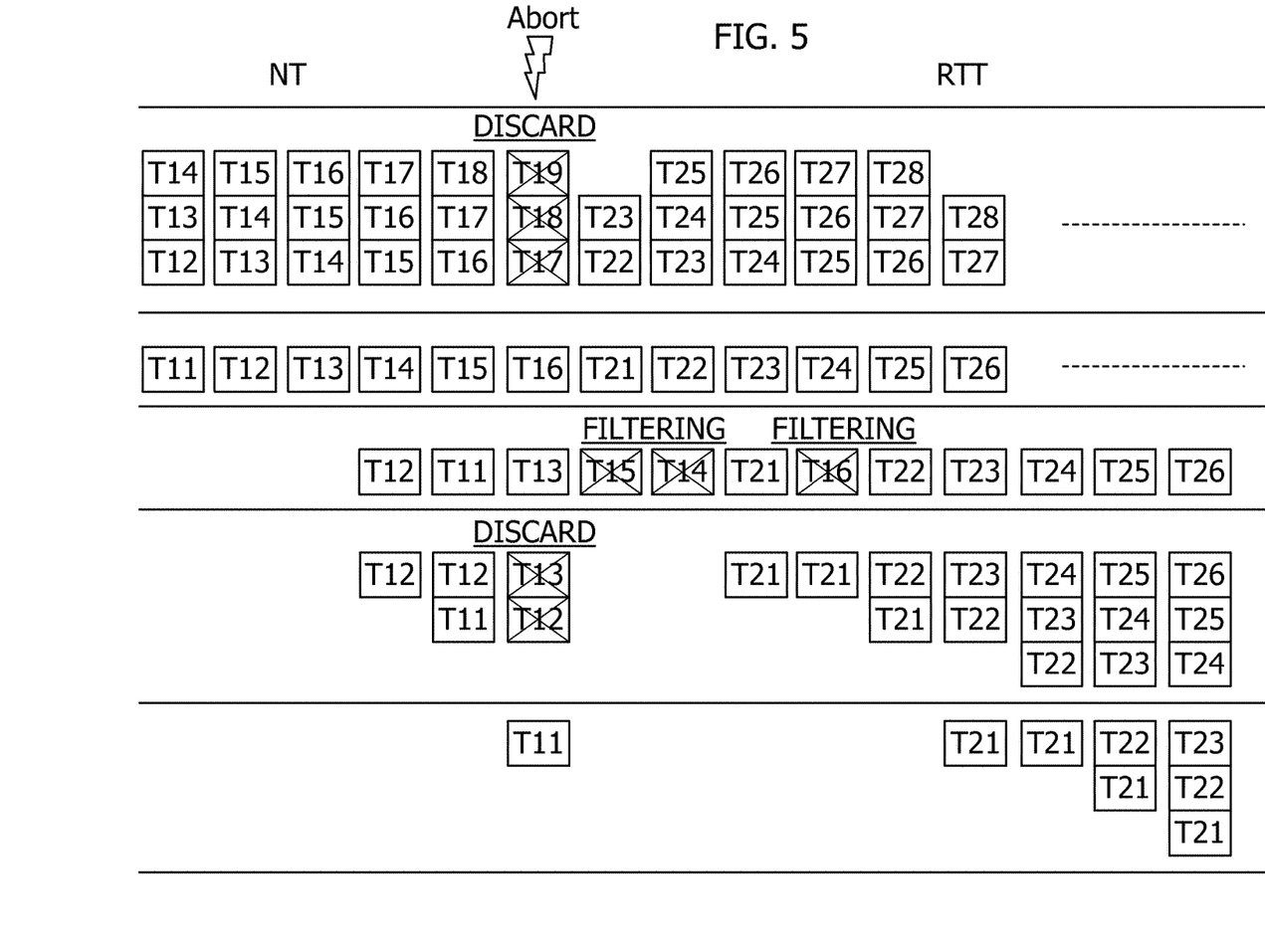
FIG. 5 is a representation of the operation of an embodiment.

The diagram in FIG. 5 shows the overall arrangement of a possible embodiment of the operation criteria previously described by way of example.

In detail, the diagram of FIG. 5 may be considered as ideally divided into two areas or zones, which respectively handle:
    the execution, before receiving the Abort signal, of transactions T11 to T19 concerning "old" or "normal" tasks, which are to be aborted following the reception of the Abort signal itself (area or zone NT, on the left), and
    the start, at the reception of the Abort signal, of transactions T21 to T28 concerning "new" tasks T21 to T28, for example in real time, the execution of which is started in a pipelining mode when the transactions concerning the old tasks are discarded (area or zone RTT, on the right).

The crossed cells correspond to:

data and/or transactions such as memory access requests (T12, T13, T17, T18, T19) which, upon arrival of the Abort signal, are located within interface block PLUG and are discarded (DISCARD), transactions (T14, T15, T16) which, upon arrival of the Abort signal, are pending and are discarded at their return via the filtering mechanism (FILTERING) previously described, which is performed while the transactions concerning new tasks are already being executed.

As for cells T11, T13, T16 in the column identified by the Abort signal symbol, which are not crossed, the presently considered example (only to be construed by way of example) is based on the following assumptions:

at the time when the Abort signal is received, transaction T11 is assumed as already been read by the IP: just before this, that is in the instant corresponding to the left column, the same transaction was on the response bus and had been stored in the internal memory of block PLUG;

transaction T13 is assumed as being coming back exactly at the moment when the Abort signal is received. This transaction is simultaneously stored in the internal memory of PLUG and aborted (T13 is in the row below and is crossed): in the example of FIG. 5 it is therefore assumed that a response transaction on the bus is immediately stored in the module PLUG (in the same column). In various embodiments it may be assumed, for example, that a response transaction on the bus is stored in PLUG subsequently (following column);

upon arrival of the Abort signal it is assumed that transaction T16 has already been sent to block PLUG on the bus (exactly at the same instant). As a consequence, such a transaction is marked as aborted within block PLUG, and therefore the corresponding response transaction will be filtered at the correct time according to the previously described procedure. Specifically, once again in FIG. 5 it may be observed that transaction T16 is assumed to have been received on the response bus, and filtered four columns afterwards.

It will be moreover appreciated that, for simplicity, FIG. 5 does not contain any reference to transaction identifiers. The names assigned to the transactions are provided to highlight the association between task and transaction: specifically, the first index identifies the task, the second index identifies the transaction within the same task.

The diagram in FIG. 5 may therefore be seen as composed of five overlaying rows, each of them concerning one stage of the pipeline, e.g.:

Row 1: Request transactions stored in the PLUG
Row 2: Bus request transactions
Row 3: Bus response transactions
Row 4: Response transactions stored in the PLUG
Row 5: Response transactions received by the IP.

In various embodiments, the procedure presently discussed by way of example facilitates the pipeline remaining full even after the Abort command, facilitating an efficient use of work resources.

In various embodiments, it is possible to originate a solution which is independent from the protocol(s) in use. For example, in the case of protocols which do not comprise identifier signals of the TID type, it is possible to resort to equivalent identifiers, in case using corresponding ordering rules: a possible example is given by the identifiers known in the AMBA context as AXI Source ID.

In various embodiments, it is also possible to execute an interleaving of "aborted" and "non-aborted" identifiers.

Various embodiments allow moreover to handle the case wherein, before completing a procedure as exemplified (e.g., before reaching step 114), another abort signal arrives: various embodiments actually offer the possibility to start from scratch again, whatever the current state of the system.

As for performances, the presently considered exemplary embodiments may facilitate an extremely rapid execution of an abort procedure, for example in a single clock cycle.

All identifiers (TIDs or similar) that have not been aborted may be used immediately for a new task (with smaller size) and, when an identifier already marked as aborted comes back, it may be made immediately available for a new task.

As for the support on a hardware level, the internal states of the identifiers may be updated, in order to add aborted identifiers (marking of aborted transactions), while the filtering function (for example block 122 in FIG. 4) may be handled with a common control logic, which also handles the states of the identifiers.

Figure 6:
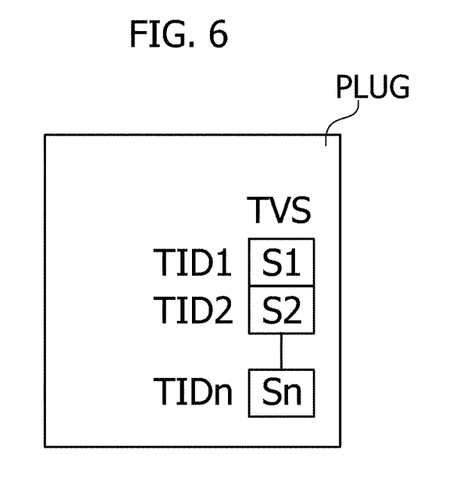
FIG. 6 is a vector representation of identifiers of an embodiment.

In various embodiments this function, e.g., the marking of transactions which are to be aborted, may be performed via a mechanism which represents the state of the identifiers through vectors (e.g., TID Vector State or TVS, referring to the example of TID identifiers), as schematically represented in the diagram of FIG. 6, wherein the vector denoted by TVS represents the sequence of states S1, S2, . . . , Sn of the various identifiers TID1, TID2, . . . , TIDn.

In various embodiments, vector TVS may be used in the interface module PLUG to perform other functions as well, such as reordering, detection of access ends (DMA), and so on.

Figure 7:
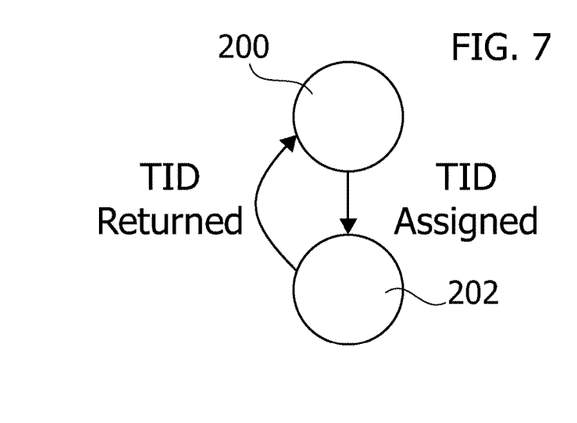
FIG. 7 is a state diagram of an embodiment.

The diagram in FIG. 7 is a state diagram respectively comprising two states, 200, 202 which may be seen as:

a "valid" state: the identifier (for example TID) is available, and may be assigned to a new transaction, and a "non-valid" state: the identifier (for example TID) relates to a pending transaction and may not be used.

In general, in normal operation as represented in FIG. 7, the passage from state 200 to state 202 takes place when an identifier is assigned (TID assigned), while the passage in the opposite direction, from state 202 to state 200, is obtained when the related transaction "comes back" (TID return).

Figure 8:
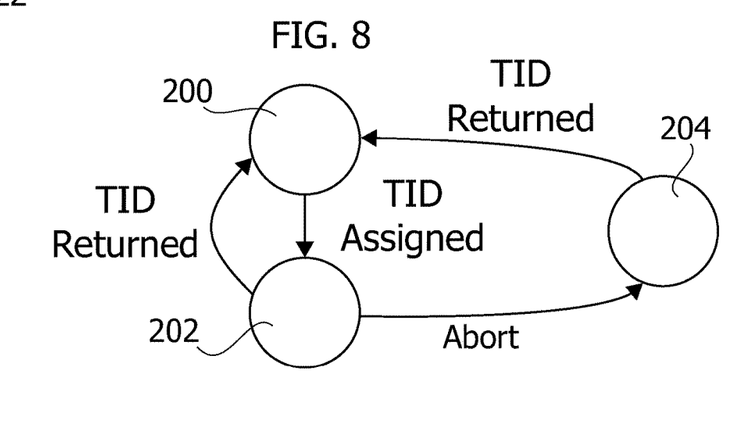
FIG. 8 is a state diagram of an embodiment.

The diagram in FIG. 8 shows a possible embodiment of the mechanism previously described to the state diagram of FIG. 7.

The diagram of FIG. 8 provides the presence of a further state 204, which represents the fact that one particular identifier (for example TID), which is assigned to a pending transaction to be aborted, is marked as "aborted", for example in step 104 of FIG. 3, following the reception of the Abort signal.

As it is marked as aborted, the above identifier passes from state 202 to state 204 and, when the related transaction is aborted, the identifier passes from state 204 to state 200, being in this way again a "valid" identifier which may be assigned to a (new) transaction.

The diagram of FIG. 9 shows, again by way of example, possible more detailed implementations of blocks 120 and 122, which have already been introduced while referring to FIG. 4. This highlights that the related functions may not depend from their location within or without block PLUG.

Figure 9:
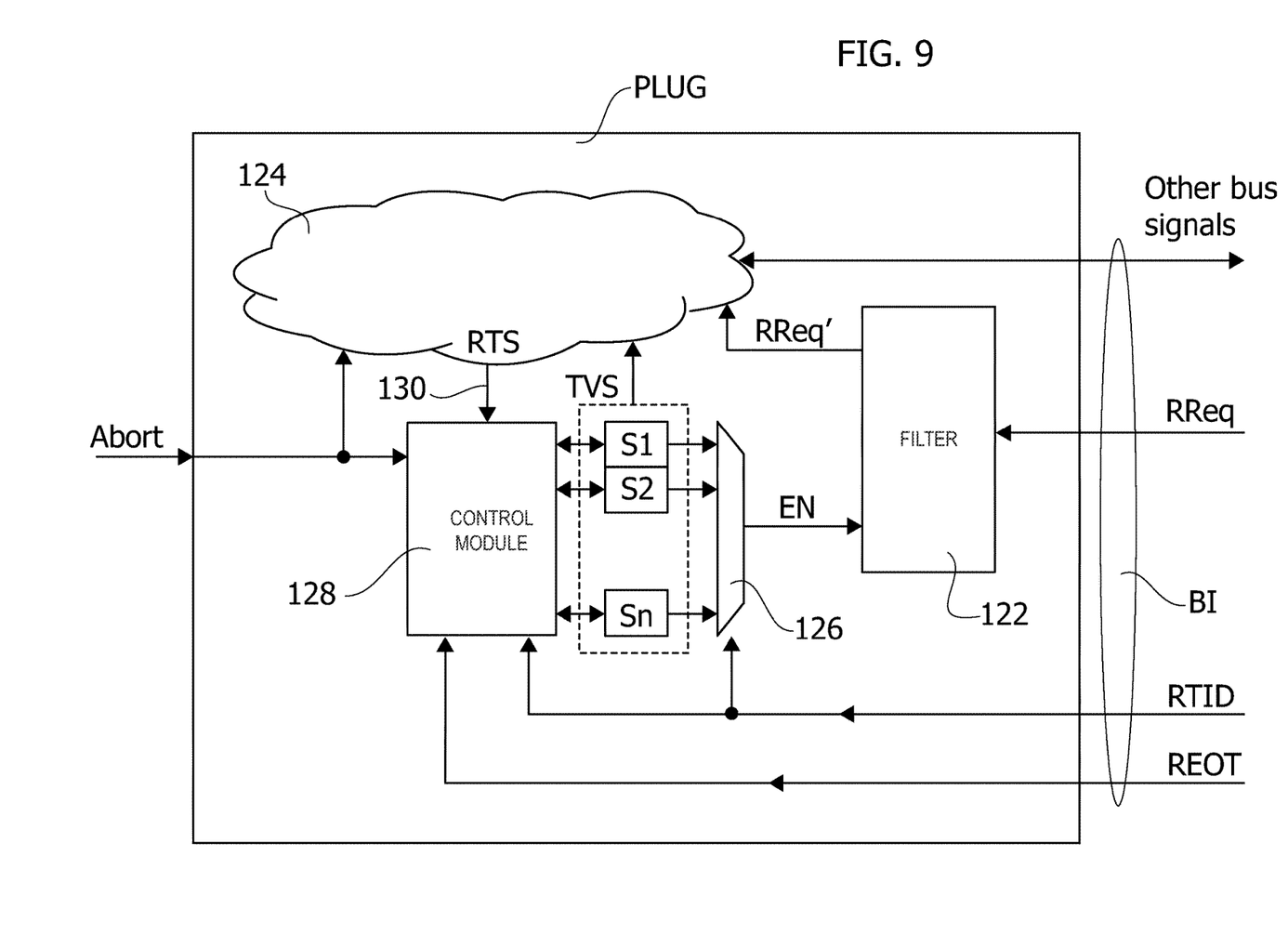
FIG. 9 is a functional block diagram of an embodiment of a device.

In FIG. 9, reference 124 represents the logic circuitry of interface block PLUG, which may be configured to perform the functions of management of data queues (for example according to a FIFO criterion), management of pending accesses (DMA), sending and receiving other bus signals (see the general diagram of FIG. 2).

As previously said with reference to FIG. 4, in various embodiments filtering block 122 may operate by sending back to logic 124, as responses RReq', those responses RReq which show up as relating to "new" transactions (not to be aborted but to be executed) after the filtering function performed as a function of the EN signal coming from block 120, which signals whether the related identifier is or is not marked as aborted.

By adopting the model introduced with reference to FIGS. 6 to 8, signal EN may be considered as coming from multiplexer 126, located at the output of a register bank which physically implements vector TVS, each register being adapted to store the state S1, S2, . . . , Sn of the various identifiers. The register bank TVS and multiplexer 126 cooperate with control module 128.

In the presently considered exemplary embodiment, block 128 receives the following inputs:
Abort signal (which may also be used as a reset signal RST towards logic 124),
a signal RTID representative of the return of the signal identifiers (e.g., TID), and
signal REOT, which carries the response concerning the end of the transaction.

It will be appreciated that such signals may already be present in solutions as exemplified in FIGS. 1 and 2.

In various embodiments (according to the specific implementation modes of interface block PLUG and the related protocols, other solutions are possible), when the Abort signal is asserted block 128 updates—by setting them to the "aborted" state (204 in FIG. 8) all "non-valid" identifiers (state 202 in FIGS. 7 and 8), because at the time they are assigned to pending transactions.

In various embodiments this may take place, as schematically shown at 130, as a function of signals generated by logic 124 in order to handle the normal operation of register TVS, e.g., for the transitions between the "valid" state 200 and the "non valid" state 202, as represented in FIG. 7. In this way, when a transaction is shown as ended (REOT=1), the state of the identifier included in the vector TVS which corresponds to such a transaction may again be switched to the "valid" state 200.

Thanks to such an operation, multiplexer 126 allows, in various embodiments, to select the state of the specific identifier (e.g., of the specific element of vector TVS) associated to a given transaction which "comes back" (identified by the signal RTID which is involved) so as to be able to assign a corresponding value to signal EN.

In various embodiments, signal EN may take on two states or levels:
a first level (for example filter_EN=1), so as to assign to signal RReq', transferred towards logic 124, a "non-asserted" value, for example equal to zero, so that the same transaction (related to an "old" task to be aborted) is aborted, and
a second level (for example filter_EN=0), so as to assign to signal RReq', transferred towards logic 124, an "asserted" value, for example RReq'=RReq, so that the same transaction (related to a "new" task) is not aborted but executed.

Various embodiments allow therefore to speed up remarkably the Abort function of transactions, through a marking and filtering function of the transactions to be aborted.

The related procedure may be used to facilitate a rapid interruption of the transactions being executed in a processing system, by resorting to a general micro-architecture which is on the whole quite simple (for example the vector of states TVS and related associated circuits and filtering unit 122).

Various embodiments may improve the management of tasks in real time even when there may be a high number of pending transactions (a typical situation in modern systems, which make wide use of buffering structures).

Various embodiments may offer advantages in improving system performance, particularly as regards the real time management, improving the flexibility and versatility of the related products. The solutions resorted to may be used on a wide range of IP modules and systems (including CPUs), with solutions which do not depend on the specific protocols used.

Of course, the details and the embodiments may vary, even appreciably, with respect to what has been described by way of non-limiting example only.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), state machines, complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    receiving, by one or more processing devices, an indication to abort one or more current tasks being executed by a signal processing system having an interface block and one or more processing cores;
    responding, by the one or more processing devices, to the received indication by:
        pipelining elimination of one or more transactions associated with said one or more current tasks; and
        concurrently initiating execution of one or more transactions associated with one or more new tasks.

2. The method of claim 1 wherein the responding includes discarding at least one data or memory access in said interface block.

3. The method of claim 1 wherein the pipelining elimination of one or more transactions includes:
    marking one or more pending transactions of the one or more transactions associated with the one or more current tasks as aborted; and
    eliminating a pending transaction marked as aborted in response to a return of transaction results associated with the pending transaction to said interface block during execution of one or more transactions associated with said one or more new tasks.

4. The method of claim 3, comprising:
    assigning respective identifiers to said one or more pending transactions;
    responding to the indication to abort by marking as aborted the identifiers assigned to the one or more pending transactions associated with said current tasks; and
    eliminating transactions whose identifiers are marked as aborted by filtering the transactions out of transaction results returned to said interface block during the execution of the one or more transactions associated with said one or more new tasks.

5. The method of claim 1 wherein transactions are assigned respective transaction identifiers, the method including assigning to one or more transactions associated with said new tasks transaction identifiers previously assigned to eliminated transactions associated with said one or more current tasks.

6. A device, comprising:
    an input configured to receive an indication to abort one or more current tasks of a signal processing system having an interface block and one or more processing cores; and
    one or more processing devices configured to respond to the indication by:
        pipelining elimination of one or more transactions associated with said one or more current tasks; and
        concurrently initiating execution of one or more transactions associated with one or more new tasks.

7. The device of claim 6 wherein the one or more processing devices are configured to discard data and memory accesses associated with the one or more current tasks in response to the indication.

8. The device of claim 6 wherein the one or more processing devices comprise:
    a memory configured to store information related to the one or more pending transactions associated with the one or more current tasks;
    a filtering module configured to filter responses to transactions; and
    a control module configured to control the memory to mark as aborted the one or more pending transactions associated with the one or more current tasks and to control the filter to discard responses to transactions marked as aborted.

9. The device of claim 8 wherein:
    said memory is configured to store a state of respective transaction identifiers assigned to transactions associated with current tasks,
    said control module is configured to assign, in response to the indication to abort said one or more current tasks, an aborted state to identifiers assigned to pending transactions associated with said one or more current tasks, and
    said filter module is configured to filter responses to transactions whose identifiers are assigned an aborted state out of responses returned to said interface block during execution of said one or more transactions of said one or more new tasks.

10. The device of claim 6 wherein transactions are assigned respective identifiers, and the control module is configured to assign to transactions of said one or more new tasks transaction identifiers previously assigned to eliminated transactions associated with said one or more current tasks.

11. A system, comprising:
    an interface configured to couple a processing system having one or more processing cores to a bus system; and
    a controller configured to respond to an indication to abort one or more current tasks by:
        pipelining elimination of one or more transactions associated with said one or more current tasks; and
        concurrently initiating execution of one or more transactions associated with one or more new tasks.

12. The system of claim 11 wherein the controller comprises:
    a memory configured to store information identifying transactions to be eliminated; and
    a filter configured to discard results associated with a transaction when the stored information indicates the transaction is to be eliminated.

13. The system of claim 12 wherein at least one of the memory and the filter are integrated into the interface.

14. A non-transitory computer-readable medium containing contents which configure one or more processing devices to perform a method, the method comprising:
    responding to an indication to abort one or more current tasks being executed by a signal processing system having an interface block and one or more processing cores by:
        pipelining elimination of one or more transactions associated with said one or more current tasks; and
        concurrently initiating execution of one or more transactions associated with one or more new tasks.

15. The non-transitory computer-readable medium of claim 14 wherein the responding includes discarding at least one data or memory access in said interface block.

16. The non-transitory computer-readable medium of claim 14 wherein the pipelining elimination of one or more transactions includes:
    marking one or more pending transactions of the one or more transactions associated with the one or more current tasks as aborted; and
    eliminating a pending transaction marked as aborted in response to a return of transaction results associated with the pending transaction to said interface block during execution of one or more transactions associated with said one or more new tasks.

17. The non-transitory computer-readable medium of claim 16, the method including:
   assigning respective identifiers to said one or more pending transactions;
   responding to the indication to abort by marking as aborted the identifiers assigned to the one or more pending transactions associated with said current tasks; and
   eliminating transactions whose identifiers are marked as aborted by filtering the transactions out of transaction results returned to said interface block during the execution of the one or more transactions associated with said one or more new tasks.

18. The non-transitory computer-readable medium of claim 17 wherein transactions are assigned respective transaction identifiers, the method including assigning to one or more transactions associated with said new tasks transaction identifiers previously assigned to eliminated transactions associated with said one or more current tasks.

19. A device, comprising:
   an input configured to receive an indication to abort one or more current tasks of a signal processing system having an interface and one or more processing cores; and
   one or more processing devices configured to respond to the indication by pipelining elimination of one or more pending transactions associated with the one or more current tasks, the pipelining elimination of the one of more pending transactions including:
      identifying one or more pending transactions associated with said one or more current tasks to be aborted;
      concurrently initiating execution of one or more transactions associated with one or more new tasks; and
      filtering received transaction results based on the identified one or more pending transactions associated with said one or more current tasks.

20. The device of claim 19 wherein the one or more processing devices are configured to discard data in the interface that is associated with the one or more current tasks in response to the indication.

21. The device of claim 19 wherein the one or more processing devices comprise:
   a memory configured to store information identifying the one or more pending transactions associated with the one or more current tasks;
   a filter configured to filter responses to transactions; and
   a controller configured to control the memory to mark as aborted the one or more pending transactions associated with the one or more current tasks and to control the filter to discard responses to transactions marked as aborted.

22. The device of claim 21 wherein:
   said memory is configured to store a state of respective transaction identifiers assigned to transactions associated with current tasks,
   said controller is configured to assign, in response to the indication to abort said one or more current tasks, an aborted state to identifiers assigned to pending transactions associated with said one or more current tasks, and
   said filter is configured to filter responses to transactions whose identifiers are assigned an aborted state out of responses returned to said interface during execution of said one or more transactions associated with said one or more new tasks.

23. The device of claim 19 wherein transactions are assigned respective identifiers, and the control module is configured to assign to transactions of said one or more new tasks transaction identifiers previously assigned to eliminated transactions associated with said one or more current tasks.

24. A system, comprising:
   means for pipelining elimination of pending transactions associated with aborted tasks of a signal processing device; and
   means for concurrently initiating execution of transactions associated with one or more new tasks of the signal processing device.

25. The system of claim 24 wherein the means for eliminating is configured to filter out responses to eliminated transactions during execution of transactions associated with the one or more new tasks of the signal processing device.

26. The system of claim 24, further comprising the signal processing device.

27. The system of claim 24 wherein the means for eliminating and the means for initiating are integrated into an interface of the signal processing device.

28. The system of claim 24 wherein the system is configured to respond to an indication to start one or more new tasks by aborting a plurality of current tasks.

29. The method of claim 1, comprising:
   generating, in response to an indication to perform the one or more new tasks, the indication to abort the one or more current tasks.

30. The method of claim 29 wherein the one or more new tasks comprise one or more time-sensitive tasks.

31. The method of claim 1 wherein the indication to abort one or more current tasks is an indication to abort a plurality of current tasks and the pipelining elimination of one or more transactions associated with said one or more current tasks comprises elimination of transactions associated with more than one current task.

32. The device of claim 6 wherein the indication to abort one or more current tasks is an indication to perform the one or more new tasks.

33. The device of claim 32 wherein the one or more new tasks comprise one or more tasks to be performed in real time.

34. The device of claim 6 wherein the indication to abort one or more current tasks is an indication to abort a plurality of current tasks and the pipelining elimination of one or more transactions associated with said one or more current tasks comprises elimination of transactions associated with more than one current task.

35. The system of claim 11 wherein the indication to abort one or more current tasks is an indication to perform the one or more new tasks.

36. The system of claim 11 wherein the indication to abort one or more current tasks is an indication to abort a plurality of current tasks and the pipelining elimination of one or more transactions associated with said one or more current tasks comprises elimination of transactions associated with more than one current task.

* * * * *

UNITED STATES PATENT AND TRADEMARK OFFICE
CERTIFICATE OF CORRECTION

| | | |
|---|---|---|
| PATENT NO. | : 9,632,793 B2 | Page 1 of 1 |
| APPLICATION NO. | : 13/888062 | |
| DATED | : April 25, 2017 | |
| INVENTOR(S) | : Daniele Mangano | |

It is certified that error appears in the above-identified patent and that said Letters Patent is hereby corrected as shown below:

In the Claims

Column 15, Line 28, Claim 9:
"current tasks, the pipelining elimination of the one of"
Should read:
--current tasks, the pipelining elimination of the one or--.

Signed and Sealed this
Third Day of October, 2017

Joseph Matal
*Performing the Functions and Duties of the*
*Under Secretary of Commerce for Intellectual Property and*
*Director of the United States Patent and Trademark Office*